Jan. 14, 1930.  R. A. BLISH ET AL  1,743,103
DRINK MIXER
Filed May 4, 1929   2 Sheets-Sheet 1
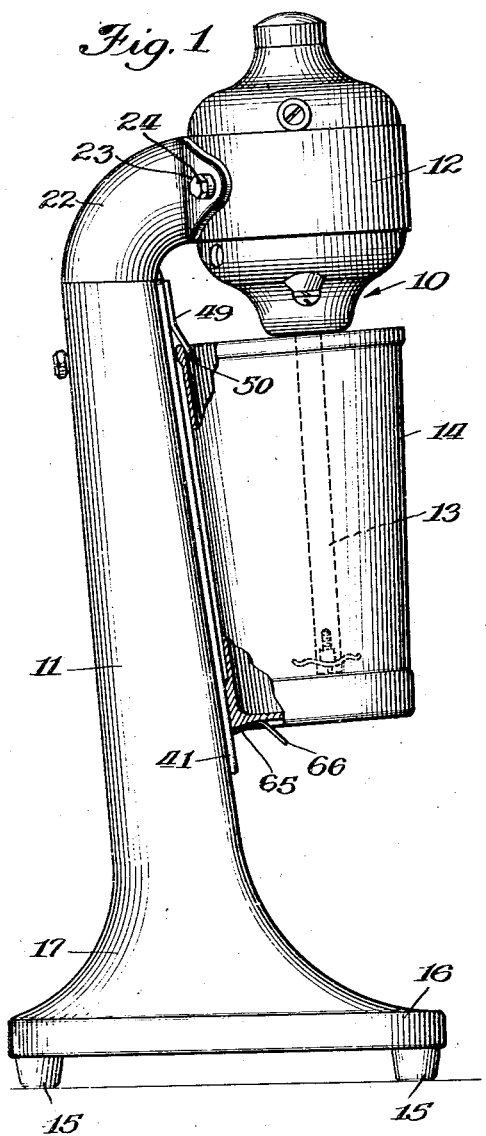
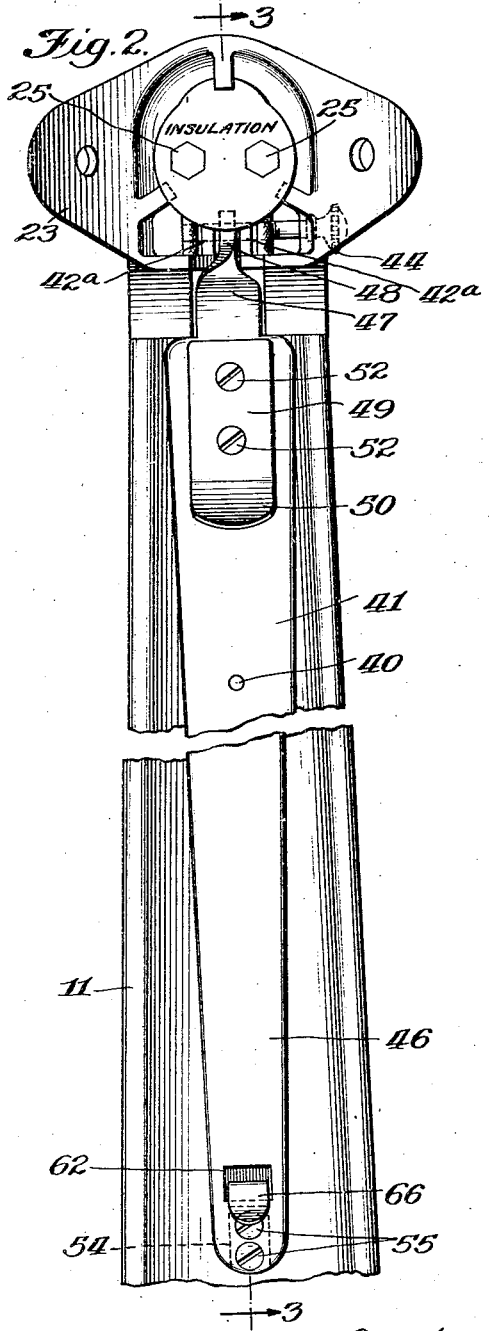
Inventors:
Russell A. Blish
Arthur P. Jorgenson
By Williams Bradbury McCaleb
& Hinkle Attys.

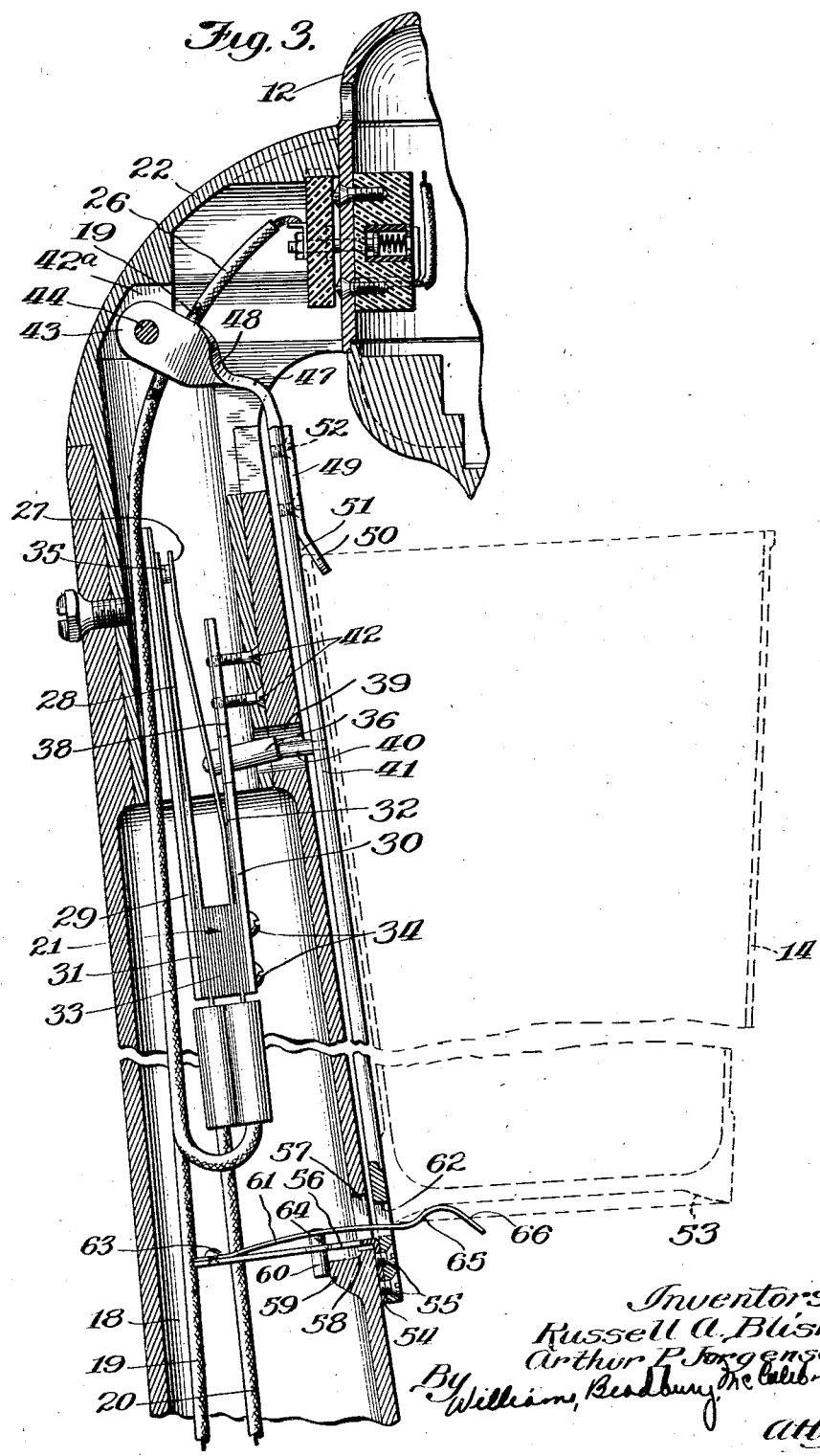

Patented Jan. 14, 1930

1,743,103

UNITED STATES PATENT OFFICE

RUSSELL A. BLISH AND ARTHUR P. JORGENSON, OF RACINE, WISCONSIN, ASSIGNORS TO ARNOLD ELECTRIC CO., OF RACINE, WISCONSIN, A CORPORATION OF WISCONSIN

DRINK MIXER

Application filed May 4, 1929. Serial No. 360,453.

The present invention relates to drink mixers, and is particularly concerned with drink mixers adapted to be actuated by the placing of a receptacle in operative position, or by the weight of the receptacle or its contents.

In drink mixers of this type, it is highly desirable that the receptacle be firmly secured in operative position about the mixer agitator to prevent rattling, splashing or spilling, and it is also desirable that the motor control switch be positively actuated to prevent vibration of the contacts and the consequent arcing which results in burning and pitting the contacts. It is also necessary to reduce to a minimum the number of operations or movements required in the use of the mixer, so that an operator may serve a greater number of people with a minimum expenditure of time and effort, and consequently the device employed to accomplish the foregoing results should preferably be actuated coincident to the placing of the receptacle in operative position, as by the act of placing the receptacle or by the weight of the receptacle or its contents.

One of the objects of the present invention is the provision of a drink mixer which includes common means actuated by the placing of the receptacle for simultaneously securing the receptacle in operative position and accomplishing positive actuation of the motor control switch.

Another object is the provision of a drink mixer having resilient means for securing the receptacle against rattling and for simultaneously latching the motor control switch in closed position.

Another object is the provision of a drink mixer having means actuated by the removal of the receptacle for releasing said receptacle and for releasing a motor control switch which is positively secured in closed position during the operation of the mixer.

Another object is the provision of a drink mixer having a pivoted receptacle support for actuating a motor control switch, said support being resiliently held in receptive position by said switch, and means carried by said support for securing a receptacle thereon and for holding said support in position to positively secure the switch against vibration.

Other objects and advantages of the invention will be apparent from the following description and from the accompanying drawings, in which similar characters of reference indicate similar parts throughout the several views.

Referring to the drawings, of which there are two sheets;

Fig. 1 is a side elevational view of the drink mixer and receptacle with the parts in the operative position of the mixer, that is, with the switch closed and the motor running;

Fig. 2 is an elevational view of the standard and receptacle support with the motor and receptacle removed and the parts in receptive position, that is, ready to receive the receptacle;

Fig. 3 is a medial sectional view taken through Fig. 1 in a plane parallel to the plane of the paper with the parts in running position.

Referring to Fig. 1, 10 indicates the drink mixer assembly in its entirety, the mixer preferably including a support or standard 11, a motor 12, an agitator 13 driven by the motor 12 and a receptacle 14.

In the embodiment chosen to illustrate the invention, the standard 11 comprises a cast metal base 17 having rubber feet 15 and a pair of forwardly extending portions 16 for guiding the receptacle into operative position. The base 17 is provided with a hollow interior conduit 18 for receiving the conductors 19 and 20 leading to a supply circuit, and for receiving an electric switch 21 for controlling the motor circuit. The standard 11 may be provided with a separate motor head 22 comprising a hollow cast metal member having a pair of curved attaching flanges 23 for engaging the casing of the motor 12 and for securing said motor to the standard by a pair of bolts 24. The motor head 22 is provided with contacts 25 adapted to engage contacts carried by the motor 12 and one conductor 19 may be connected to one of the contacts 25. The other contact 25 is connected by a conductor 26 to a movable switch contact 27, while the supply conductor 20 is connected to the fixed switch contact 28 so that the switch contacts are adapted to make and break the motor circuit.

The switch 21 may comprise a frame consisting of a pair of metal plates 29 and 30 separated by layers of insulation 31 and 32 from the resilient contact members 27 and 28. The metal plates 29 and 30, contact members 27 and 28 and the spacing members 33 of insulation may all be clamped together by a pair of screw bolts 34 passing through the plate 30, contacts and insulation and threaded into the plate 29, it being understood that the contact springs 27 and 28 are provided with enlarged apertures about the bolts 34 to effectively insulate the contact springs from each other and from the supporting plates.

The contact springs 27 and 28 may be provided with aligned contact points 35 and the movable contact spring 27 is provided with an actuating member or button 36 adapted to project through an aperture 38 in plate 20 and an aperture 39 in the standard 11 so that it may be engaged by a pin 40 carried by the receptacle support 41.

The switch 21 may be secured in the standard by a pair of screw bolts 42 passing through the neck of the motor head 22 and threaded into the plate 30, drawing the edges of the plate into engagement with the substantially cylindrical bore or conduit in the motor head 22.

The motor head 22 is provided upon its interior with a pair of forwardly projecting lugs 42ª spaced to receive the end 43 of a motor support 41 and one of the lugs 42ª may be threaded to receive the end of a screw bolt 44 adapted to project into the motor head 22 through the lugs 41 for pivotally supporting the end 43 of motor support 41. In some embodiments of the invention, the motor head and base 17 may constitute an integral piece, but the provision of a separate motor head facilities the assembly of the parts of the device with a minimum expenditure of time and labor. It should also be understood that the present invention is not limited to the use of a specific type of receptacle support and other types of receptacle carriers may be used within the scope of the appended claims.

The receptacle support 41 comprises an elongated strip of sheet metal which may taper toward its lower end 45 and the receptacle support may be laterally curved to present a forward concave face 46 for better receiving the complementary surface upon the receptacle 14.

At its upper end the lever 41 is bent at 47 so that the upper end 43 may extend into the standard 11, while the main body of the lever 41 extends longitudinally of the standard. The end 43 may also be twisted at 48 through an angle of substantially 90 degrees, so that the end 43 may lie in a plane at right angles to the bolt 44 which pivotally supports this end of the lever.

The receptacle support or lever 41 is provided adjacent its upper end with means for engaging an upper part of the receptacle 14, which may comprise a sheet metal member 49 having a downwardly and forwardly projecting flange 50 for guiding the edge of the receptacle 14 into the slot 51 formed between said flange 50 and lever 41. The retaining member 49 is secured to the receptacle support 41 by any convenient fastening means such as a pair of screw bolts 52.

The receptacle 14 preferably comprises a sheet metal member of substantially the shape shown, which is provided with a depending annular shoulder 53 upon its bottom adjacent the outer edge. In the present embodiment, the annular shoulder 53 comprises a substantially frusto conical portion, but any equivalent shape of shoulder may be used. When the receptacle 14 is not in the operative position shown in Figs. 1 and 3, the receptacle support 41 is resiliently urged away from the standard 11 by the contact spring 27 acting through the pins 36 and 40 and the contact points 35 are open.

The receptacle support 41 is preferably provided with means for engaging and securing the receptacle 14 in operative position and for simultaneously holding the switch 21 in closed position.

In the present embodiment this may be accomplished by providing the lower end of the receptacle support 41 with a sheet metal bracket 54 secured to the rear side of the lever 41 by a pair of screw bolts 55. The bracket 54 is provided with a rearwardly projecting arm 56 which extends through an aperture 57 provided in standard 17.

The standard 17 is also provided with a pair of shoulders 58 and 59 adjacent the aperture 57 and adapted to be engaged by a stop member comprising a pin 60 carried by a resilient sheet metal member 61.

The lever 41 is also provided with an aperture 62 adapted to register with aperture 57 and the arm 56 of bracket 54 is provided with a screw bolt 63 for securing the spring 61 adjacent the inner end of the arm. The pin 60 may consist of a metal pin riveted to the spring 61 and extending through aperture 64 in the arm 56 so that it is adapted to engage either shoulders 56 or 59 depending upon the position of the spring 61.

The outer end of spring 61 may be bent upward at 65 to form a shoulder for engaging the annular shoulder 53 carried by receptacle 14 and the spring may also be bent downward at 66 to provide a cam surface for engagement with the outer edge of the bottom of receptacle 14 to cam the spring downward when the receptacle is moved into operative position. The length of the pin 60 is such that when the receptacle is in the position shown in Fig. 3, the pin 60 engages behind shoulder 59 on the standard, but when the receptacle has been removed the spring 61 moves upward to a position where the pin 60 engages behind shoulder 58 on the standard 11. Upward movement of the spring 61 is limited by the wall of aperture 62, but the aperture 57 should preferably be of such a size that the pin 60 may be passed through the aperture 57 when the complete motor support 41 is assembled with the standard.

It should also be noted that the slot between the lugs 42 permits the end 43 of lever 41 to be moved upward slightly past its normal position during the assembly of the device in order to permit the pin 60 to clear the lower edges of aperture 57.

The operation of the drink mixer is as follows: When the receptacle 14 is removed from the mixer for filling with the ingredients to be mixed, the lever 41 is in the position of Fig. 2 with its lower end spaced from the standard 11 and the pin 60 engaging shoulder 58. The switch contact points 35 are open and the motor 12 is deenergized.

The operator may then slide the receptacle 14 in below the agitator 13, sufficient clearance being provided between the end of the agitator and the table or other support to permit the receptacle 14 to clear the agitator. The edge of the receptacle 14 is passed between the agitator and the end 66 of spring 61 and moved to the position where the edge of the receptacle is received in slot 51, formed by the upper retaining member 49. The bottom of the receptacle may then be pivoted clockwise in Fig. 1 toward the standard 11 engaging the cam surface 66 upon spring 61 and forcing the spring 61 downward. At the same time, the engagement of the receptacle with the receptacle support 41 will cause the lever 41 to pivot in a clockwise direction (Fig. 3) until it reaches the position of Fig. 3, the pin 40 and button 36 actuating the switch contact 27 to close the switch and start the motor.

As the receptacle 14 is moved into the position of Fig. 3, the spring 61 engages behind annular shoulder 53 and the pin 60 engages behind shoulder 59, the spring 61 both resiliently securing the receptacle 14 in place and latching the switch actuating lever 41 in the position of Fig. 3. The receptacle is thus firmly secured against rattling which might result from the operation of the motor and the contact points 35 are securely held in closed position by the pin 60 so that there is no possibility of vibration of the contacts or arcing of the contacts due to vibration.

When the receptacle 14 is to be removed, the lower end of the receptacle may be moved outward from the standard, the annular shoulder 53 engaging the surface 65 to cam the spring 61 downward to release the receptacle 14. As soon as the receptacle has passed out of engagement with spring 61, the spring 61 will move upward until it engages the edge of aperture 62, the pin 60 moving out of engagement with shoulder 59, after which the switch actuating lever 41 will be moved counter-clockwise to permit the contact points 35 to open. The upper edge of the receptacle 14 may be disengaged by simply moving the receptacle downward from about the agitator 13.

It will thus be observed that the device of the present invention is adapted to positively actuate the switch and simultaneously secure the switch in closed position and the receptacle in operative position by the mere placing of the receptacle. The switch may be released by simply moving the receptacle out of operative position and the results desired are accomplished without any extra effort on the part of the user of the mixer.

While we have illustrated and described a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a drink mixer, the combination of a motor support with a motor control switch and means carried by said support for engaging the top and bottom of a receptacle and for holding said motor control switch in closed position comprising an upper engaging member, a lower engaging member and latching means carried by the latter member for engaging said support when a receptacle is held by said support.

2. In a drink mixer, the combination of a switch for controlling a motor, a switch actuating member for holding a receptacle, said actuating member being biased to receptive position by said switch, a shoulder carried by said member for engaging the top portion of said receptacle, and a resilient device carried by said member for engaging the bottom of said receptacle and for holding said actuating member in closed position.

3. In a drink mixer, the combination of a standard with an electric motor switch, a pivoted receptacle holding device carried by said standard, a hook on said holding device for engaging a top portion of said receptacle, a bracket carried by the bottom of said device and projecting into said standard, a resilient member carried by said bracket for engaging the bottom of a receptacle and a shoulder carried by said resilient member for latching said switch in closed position.

4. In a drink mixer, the combination of a standard with a motor switch in said standard, a switch lever pivotally mounted on said standard and urging said lever away from said standard, a pair of shoulders carried by said standard, and stop means carried by said lever for engaging one or the other of said shoulders.

5. In a drink mixer, the combination of a standard with a motor switch in said standard, a switch lever pivotally mounted on said standard and urging said lever away from said standard, a pair of shoulders carried by said standard, and stop means carried by said lever for engaging one or the other of said shoulders, said stop means having a part adapted to be engaged in the act of placing said receptacle into operative position.

6. In a drink mixer, the combination of a standard with a motor switch in said standard, a switch lever pivotally mounted on said standard and urging said lever away from said standard, a pair of shoulders carried by said standard, stop means carried by said lever for engaging one or the other of said shoulders, and resilient means for gripping a receptacle and for actuating said stop means to latch said switch in closed position.

7. In a drink mixer, the combination of a standard with a motor switch in said standard, a switch lever pivotally mounted on said standard and urging said lever away from said standard, a pair of shoulders carried by said standard, stop means carried by said lever for engaging one or the other of said shoulders, and resilient means for gripping a receptacle and for actuating said stop means to simultaneously latch said lever in fixed position and hold said receptacle in operative position.

8. In a drink mixer, the combination of a motor support, with a motor control switch, carrier means carried by said support for securing a receptacle on said support, operative mechanical connections between said carrier means and said switch, said carrier means including means for holding said motor control switch in a predetermined position.

9. In a drink mixer, the combination of a standard with a motor, a motor switch, an agitator, a receptacle support for actuating said switch, and a resilient member carried by the receptacle support for securing a receptacle thereon and for simultaneously securing said switch in closed position.

10. In a drink mixer, the combination of a standard with a motor, a motor switch, an agitator, a receptacle support for actuating said switch, and a resilient member carried by the receptacle support for securing a receptacle thereon and simultaneously securing said switch in closed position, comprising a resilient member having a shoulder for engaging a shoulder on said standard.

In witness whereof, we hereunto subscribe our names this 30th day of April, 1929.

RUSSELL A. BLISH.
ARTHUR P. JORGENSON.